(12) United States Patent
Wei

(10) Patent No.: US 8,411,983 B2
(45) Date of Patent: Apr. 2, 2013

(54) METHOD AND APPARATUS FOR PRODUCING A CONTRAST ENHANCED IMAGE

(75) Inventor: Jeff Wei, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 925 days.

(21) Appl. No.: 11/848,922

(22) Filed: Aug. 31, 2007

(65) Prior Publication Data

US 2009/0060367 A1   Mar. 5, 2009

(51) Int. Cl.
*G06K 9/00* (2006.01)
*G06K 9/40* (2006.01)

(52) U.S. Cl. .................. 382/260; 382/266; 382/168

(58) Field of Classification Search .......... 382/168–172, 382/199, 254, 266; 348/222.1, 602, 672
See application file for complete search history.

(56) References Cited

U.S. PATENT DOCUMENTS

| | | | | |
|---|---|---|---|---|
| 5,822,453 | A * | 10/1998 | Lee et al. | 382/169 |
| 6,163,621 | A * | 12/2000 | Paik et al. | 382/169 |
| 6,915,024 | B1 * | 7/2005 | Maurer | 382/274 |
| 6,954,550 | B2 * | 10/2005 | Fujieda | 382/199 |
| 7,023,580 | B2 * | 4/2006 | Zhang et al. | 358/1.9 |
| 7,046,858 | B2 * | 5/2006 | Sobol | 382/274 |
| 7,068,853 | B2 * | 6/2006 | Loveridge et al. | 382/274 |
| 7,194,142 | B2 * | 3/2007 | Maurer | 382/258 |
| 7,227,992 | B2 * | 6/2007 | Ono et al. | 382/167 |
| 7,382,414 | B2 * | 6/2008 | Nakajima et al. | 348/625 |
| 7,463,784 | B2 * | 12/2008 | Kugo | 382/263 |
| 7,702,151 | B2 * | 4/2010 | Takahashi | 382/169 |
| 7,738,044 | B2 * | 6/2010 | Arici et al. | 348/631 |
| 7,835,588 | B2 * | 11/2010 | Parkkinen et al. | 382/274 |
| 2006/0044431 | A1 * | 3/2006 | Ovsiannikov | 348/294 |
| 2009/0232401 | A1 * | 9/2009 | Yamashita et al. | 382/199 |

OTHER PUBLICATIONS

Gonzalez, R.C. and R.E. Woods, "Section 3.3: Histogram Processing", Digital Image Processing, 2002, pp. 88-108, Prentice-Hall, New Jersey.

* cited by examiner

*Primary Examiner* — Andrae S Allison
(74) *Attorney, Agent, or Firm* — Faegre Baker Daniels LLP

(57) ABSTRACT

A method and apparatus for enhancing an input image to produce a contrast enhanced output image is disclosed. The method involves producing a contrast value for each pixel in the input image, the contrast value being proportional to an intensity gradient between each respective pixel and at least one pixel adjacent the respective pixel. The method also involves selecting pixels in the input image having respective contrast values that meet a first criterion, thereby forming a selected plurality of pixels and producing a frequency distribution of intensity values of the selected plurality of pixels. The method further involves selecting at least one range of intensity values in the frequency distribution that meet a second criterion, thereby producing a selected range of intensity values for enhancement. The method also involves producing the contrast enhanced output image by at least one of (i) expanding pixel intensity values in the input image that fall within the selected range of intensity values; and (ii) compressing pixel intensity values in the input image that fall outside the selected range of intensity values.

31 Claims, 12 Drawing Sheets

| li | lo |
|---|---|
| 0 | 0 |
| 1 | 1 |
| 2 | 2 |
| . | . |
| . | . |
| 53 | 44 |
| 54 | 44 |
| 55 | 45 |
| 56 | 46 |
| 57 | 47 |
| 58 | 48 |
| . | . |
| . | . |
| 89 | 87 |
| 90 | 89 |
| 91 | 90 |
| 92 | 92 |
| 93 | 94 |
| 94 | 95 |
| 95 | 97 |
| . | . |
| . | . |
| 118 | 130 |
| 119 | 131 |
| 120 | 132 |
| 121 | 133 |
| . | . |
| . | . |
| 252 | 252 |
| 253 | 253 |
| 254 | 254 |
| 255 | 255 |

FIG. 11

METHOD AND APPARATUS FOR PRODUCING A CONTRAST ENHANCED IMAGE

FIELD OF INVENTION

This invention relates generally to image processing and more particularly to contrast enhancement of images.

BACKGROUND OF THE INVENTION

Digital images are commonly used in a wide variety of applications. For example, digital television, computers, cellular telephones, digital cameras, and gaming consoles, all display and/or manipulate digital image content in various image formats.

A digital image is a two-dimensional representation of an image scene using set of spatially located picture elements or pixels. Digital images must often represent a large range of intensity values occurring in the image scene using a limited number of quantized intensity levels (e.g. 256 quantized intensity values for an 8-bit image). In certain circumstances, image capture and display technology limitations may result in poorly displayed contrast between pixels having similar intensities. The resulting image, in turn, appears to have limited detail in areas of similar pixel intensity.

Contrast enhancement may be applied to images in an attempt to correct such losses in image detail by altering intensity values of certain pixels in the image. Contrast enhancement generally involves determining which of the pixel intensity values to alter, and then applying a tone mapping function to the input image pixels to produce output image pixels having improved image detail, for example.

Automating the determination of which of the pixels to alter, is difficult in practice. Manual contrast enhancement may be applied to still images by manipulating the tone mapping function and observing the result until a visually appealing result is achieved. Such manual manipulations are time consuming and are also not useful for automated contrast enhancement, such as may be required for video streams that include a plurality of sequential image frames.

Histogram equalization has been used to provide automatic contrast enhancement for images. Histogram equalization attempts to spread out most frequently occurring intensity values in an image over the available intensity range. However, commonly used methods of histogram equalization may result in unrealistic representation of image scenes.

Accordingly, there remains a need for efficient methods of contrast enhancement for digital images.

SUMMARY OF THE INVENTION

In accordance with one aspect of the invention there is provided a method for enhancing an input image to produce a contrast enhanced output image. The method involves producing a contrast value for each pixel in the input image, the contrast value being proportional to an intensity gradient between each respective pixel and at least one pixel adjacent the respective pixel. The method also involves selecting pixels in the input image having respective contrast values that meet a first criterion, thereby forming a selected plurality of pixels and producing a frequency distribution of intensity values of the selected plurality of pixels. The method further involves selecting at least one range of intensity values in the frequency distribution that meet a second criterion, thereby producing a selected range of intensity values for enhancement. The method also involves producing the contrast enhanced output image by at least one of (i) expanding pixel intensity values in the input image that fall within the selected range of intensity values, and (ii) compressing pixel intensity values in the input image that fall outside the selected range of intensity values.

Producing the contrast enhanced output image may involve producing a tone mapping function for mapping pixel intensity values in the input image to pixel intensity values in the output image. The tone mapping function may include a first portion for mapping pixel intensity values in the selected range of intensity values, the first portion having a slope greater than unity, and second and third portions for mapping pixel intensity values respectively above and below the selected range of intensity values, the second and third portions having a slope less than unity.

Producing the contrast enhanced output image may involve producing a look-up table having a plurality of pairs of intensity values, each pair of intensity values including an input pixel intensity value and an associated output pixel intensity value, the associated output pixel intensity value being computed in accordance with the tone mapping function.

Producing the contrast value may involve edge filtering the input image.

The edge filtering may involve edge filtering the input image using one of a Roberts edge filter, a Sobel edge filter, and a Laplacian edge filter.

The method may involve producing a contrast value map having a plurality of locations, each location being operable to hold a contrast value associated with a respective pixel in the input image.

The method may involve causing contrast values in the contrast value map that may be associated with peripherally located pixels in the input image to be set to zero.

Producing the contrast value may involve producing a contrast value proportional to an intensity gradient between each respective pixel and a plurality of pixels adjacent the respective pixel.

Forming the selected plurality of pixels that meet the first criterion may involve selecting pixels in the input image that have contrast values that fall within a pre-determined range of contrast values.

Forming the selected plurality of pixels that meet the first criterion may involve determining a range of contrast values to be used as the first criterion, and selecting pixels in the input image that have contrast values that fall within a the range of contrast values.

Producing the frequency distribution may involve producing a histogram of intensity values of the selected plurality of pixels, the histogram including a plurality of bins, each bin having an associated range of pixel intensity values and an associated count, the count representing a quantity of pixels in the selected plurality of pixels that fall within the range associated with each bin.

Producing the selected range of intensity values that meet the second criterion may involve selecting intensity values in the frequency distribution that are above a reference threshold.

The method may involve determining the reference threshold.

Determining the reference threshold may involve selecting a reference threshold to cause a pre-determined proportion of the intensity values in the frequency distribution to fall within the selected range of pixel intensity values for enhancement.

Determining the reference threshold may involve locating a peak of the frequency distribution, and setting the reference threshold to a pre-determined proportion of the peak.

In accordance with another aspect of the invention there is provided an apparatus for enhancing an input image to produce a contrast enhanced output image. The apparatus includes a filter operably configured to produce a contrast value for each pixel in the input image, the contrast value being proportional to an intensity gradient between each respective pixel and at least one pixel adjacent the respective pixel. The apparatus also includes a pixel selector operably configured to select pixels in the input image having respective contrast values that meet a first criterion, thereby forming a selected plurality of pixels. The apparatus further includes a frequency distribution generator operably configured to produce a frequency distribution of intensity values of the selected plurality of pixels. The apparatus also includes an intensity range selector operably configured to select at least one range of intensity values in the frequency distribution that meet a second criterion, thereby producing a selected range of intensity values for enhancement. The apparatus further includes an output image generator operably configured to produce the contrast enhanced output image by at least one of (i) expanding pixel intensity values in the input image that fall within the selected range of intensity values; and (ii) compressing pixel intensity values in the input image that fall outside the selected range of intensity values.

The output image generator may be operably configured to produce a tone mapping function for mapping pixel intensity values in the input image to pixel intensity values in the output image. The tone mapping function may include a first portion for mapping pixel intensity values in the selected range of intensity values, the first portion having a slope greater than unity, and second and third portions for mapping pixel intensity values respectively above and below the selected range of intensity values, the second and third portions having a slope less than unity.

The output image generator may be operably configured to produce a look-up table having a plurality of pairs of intensity values, each pair of intensity values including an input pixel intensity value and an associated output pixel intensity value, the associated output pixel intensity value being computed in accordance with the tone mapping function.

The filter may include an edge filter.

The edge filter may include one of a Roberts edge filter, a Sobel edge filter, and a Laplacian edge filter.

The filter may be operably configured to produce a contrast value map having a plurality of locations, each location being operable to hold a contrast value associated with a respective pixel in the input image.

The filter may be operably configured to cause contrast values in the contrast value map that may be associated with peripherally located pixels in the input image to be set to zero.

The filter may be operably configured to produce a contrast value proportional to an intensity gradient between each respective pixel and a plurality of pixels adjacent the respective pixel.

The pixel selector may be operably configured to select pixels in the input image that have contrast values that fall within a pre-determined range of contrast values.

The pixel selector may be operably configured to form the selected plurality of pixels that meet the first criterion by determining a range of contrast values to be used as the first criterion, and selecting pixels in the input image that have contrast values that fall within a the range of contrast values.

The frequency distribution generator may be operably configured to produce the frequency distribution by producing a histogram of intensity values of the selected plurality of pixels, the histogram including a plurality of bins, each bin having an associated range of pixel intensity values and an associated count, the count representing a quantity of pixels in the selected plurality of pixels that fall within the range associated with each bin.

The intensity range selector may be operably configured to produce the selected range of intensity values by selecting intensity values in the frequency distribution that may be above a reference threshold.

The intensity range selector may be operably configured to determine the reference threshold.

The intensity range selector may be operably configured to determine the reference threshold by selecting a reference threshold to cause a pre-determined proportion of the intensity values in the frequency distribution to fall within the selected range of pixel intensity values for enhancement.

In accordance with another aspect of the invention there is provided a computer readable medium encoded with codes for directing a processor circuit to execute a method for enhancing an input image to produce a contrast enhanced output image. The codes direct the processor circuit to produce a contrast value for each pixel in the input image, the contrast value being proportional to an intensity gradient between each respective pixel and at least one pixel adjacent the respective pixel. The codes also direct the processor circuit to select pixels in the input image having respective contrast values that meet a first criterion, thereby forming a selected plurality of pixels. The codes also direct the processor circuit to produce a frequency distribution of intensity values of the selected plurality of pixels and to select at least one range of intensity values in the frequency distribution that meet a second criterion, thereby producing a selected range of intensity values for enhancement. The codes further direct the processor circuit to produce the contrast enhanced output image by at least one of (i) expanding pixel intensity values in the input image that fall within the selected range of intensity values, and (ii) compressing pixel intensity values in the input image that fall outside the selected range of intensity values.

In accordance with another aspect of the invention there is provided a computer readable signal encoded with codes for directing a processor circuit to execute a method for enhancing an input image to produce a contrast enhanced output image. The codes direct the processor circuit to produce a contrast value for each pixel in the input image, the contrast value being proportional to an intensity gradient between each respective pixel and at least one pixel adjacent the respective pixel. The codes also direct the processor circuit to select pixels in the input image having respective contrast values that meet a first criterion, thereby forming a selected plurality of pixels. The codes also direct the processor circuit to produce a frequency distribution of intensity values of the selected plurality of pixels and to select at least one range of intensity values in the frequency distribution that meet a second criterion, thereby producing a selected range of intensity values for enhancement. The codes further direct the processor circuit to produce the contrast enhanced output image by at least one of (i) expanding pixel intensity values in the input image that fall within the selected range of intensity values; and (ii) compressing pixel intensity values in the input image that fall outside the selected range of intensity values.

In accordance with another aspect of the invention there is provided an apparatus for enhancing an input image to produce a contrast enhanced output image. The apparatus includes provisions for producing a contrast value for each pixel in the input image, the contrast value being proportional to an intensity gradient between each respective pixel and at least one pixel adjacent the respective pixel. The apparatus also includes provisions for selecting pixels in the input image having respective contrast values that meet a first criterion, thereby forming a selected plurality of pixels, provisions for producing a frequency distribution of intensity values of the selected plurality of pixels. The apparatus further includes provisions for selecting at least one range of intensity values in the frequency distribution that meet a second criterion, thereby producing a selected range of intensity values for enhancement. The apparatus also includes provisions for producing the contrast enhanced output image. The provisions for producing include at least one of (i) provisions for expanding pixel intensity values in the input image that fall within the selected range of intensity values, and (ii) provisions for compressing pixel intensity values in the input image that fall outside the selected range of intensity values.

Other aspects and features of the present invention will become apparent to those ordinarily skilled in the art upon review of the following description of specific embodiments of the invention in conjunction with the accompanying figure.

BRIEF DESCRIPTION OF THE DRAWINGS

In drawings which illustrate embodiments of the invention, by way of example only.

FIG. 11 is an exemplary look up table produced by the processor circuit shown in FIG. 2;

DETAILED DESCRIPTION

Figure 1:
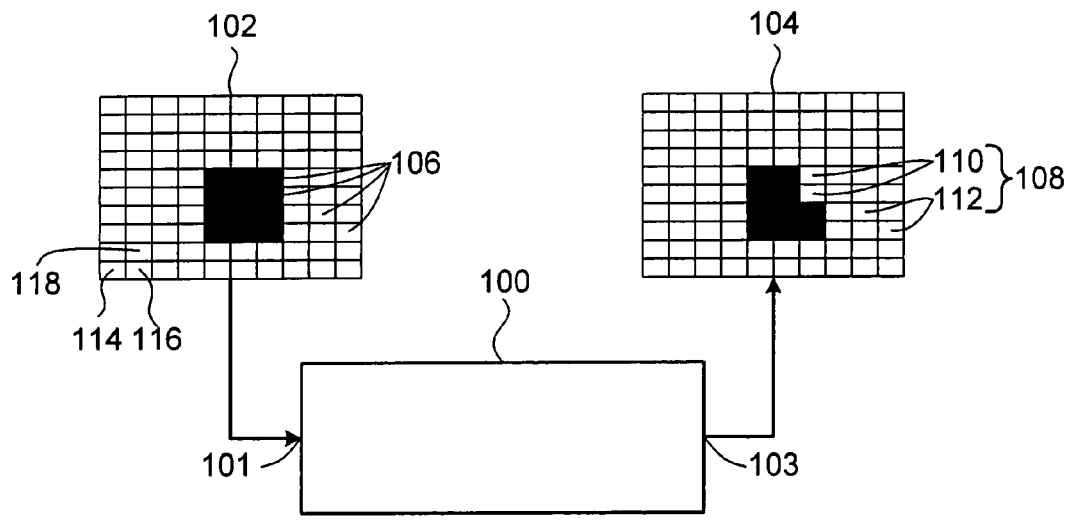
FIG. 1 is a schematic representation of an apparatus for enhancing an input image in accordance with a first embodiment of the invention.

Referring to FIG. 1, an apparatus for enhancing an input image 102 to produce a contrast enhanced output image 104 in accordance with a first embodiment of the invention is shown generally at 100. The apparatus 100 includes an input 101 for receiving the input image 102.

In this embodiment the input image 102 is a raster image including a plurality of pixels 106. Each pixel 106 has a value representing an intensity and/or color of the pixel. For example, in a color image, each pixel may be encoded in RGB color space as a 24-bit value, including three 8-bit values representing intensities of a red component (R), a green component (G), and a blue component (B) respectively. Alternatively, many compressed image formats (such as JPEG and MPEG format) use YCbCr color space encoding in preference to RGB color space encoding. In YCbCr color space, each pixel is encoded using an intensity (or brightness) value Y (known as "Luma"), a blue color value Cb, and a red color value Cr. The blue and red color values together are known as "chroma" components and these carry color information for each pixel. Grayscale images may be more simply represented by a single 8 bit value representing an intensity of each pixel.

In this embodiment, the input image 102 is encoded in a bitmapped graphics format, such as is used internally by operating systems such as Microsoft Windows®. Bitmapped file formats generally include one or more image headers followed by a data portion. The header generally provides information for interpreting the data portion. The data portion includes pixel values for each of the pixels 106 in the input image 102.

In other embodiments the input image 102 may be provided in a compressed format, such as a JPEG, in which case the image file may require decompression to produce the bitmapped input image 102.

The apparatus 100 further includes an output 103 for producing the output image 104.

In this embodiment the output image 104 is also a bitmapped raster image having a plurality of pixels 108 that generally correspond to the pixels 106 in the input image 102. The pixels 108 may include some pixels 110 that have intensity values that remain unchanged from the pixels 106 in the input image 102. The pixels 108 include at least some pixels 112 having intensity values that have been modified by the apparatus 100 to enhance contrast in the output image.

Figure 2:
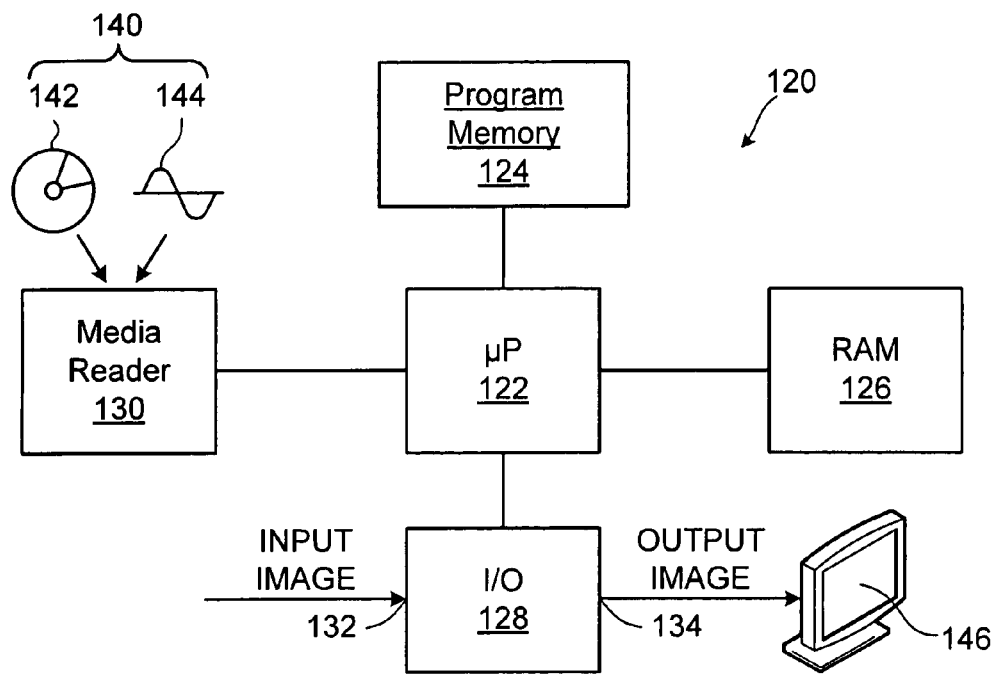
FIG. 2 is a schematic representation of a processor circuit for implementing the apparatus shown in FIG. 1.

Referring to FIG. 2, in one embodiment the apparatus 100 may be implemented using a processor circuit shown generally at 120.

The processor circuit 120 includes a microprocessor 122, a program memory 124, a random access memory (RAM) 126, an input/output port (I/O) 128, and a media reader 130, all of which are in communication with the microprocessor 122.

The RAM 126 includes a plurality of stores for storing pixel values and/or other data that may be produced while enhancing the input image 102 to produce the output image 104.

The I/O 128 includes an input 132 for receiving the input image 102, and an output 134 for producing the output image 104. In the embodiment shown the output 134 is in communication with a display 146 for displaying the contrast enhanced output image 104, although in other embodiments the output image may be saved to the RAM 126 and/or transmitted to another computer which is in communication with the processor circuit 120 in a computer network (not shown).

Program codes for directing the microprocessor 122 to execute various functions are stored in the program memory 124, which may be implemented as a flash memory, or a hard drive, for example.

The media reader 130 facilitates loading program codes into the program memory 124 from a computer readable medium 140, such as a CD ROM disk 142, or a computer readable signal 144, such as may be received over a network such as the internet, for example.

In some embodiments the processor circuit 120 may be implemented on a dedicated graphics card in a host computer (not shown). The graphics card may provide graphic processing functions for displaying images on the computer. In a graphics card, the microprocessor 122 may include a dedicated graphics processor unit (GPU) and the RAM 126 may include video RAM (VRAM), both of which may be optimized for graphics processing functions. In such embodiments the input image 102 may be written directly into the RAM 126 by the host computer.

In other embodiments (not shown), the processor circuit 120 may be partly or fully implemented using logic elements such as field programmable gate arrays (FPGA) and/or application specific integrated circuits (ASIC), for example.

Figure 3:
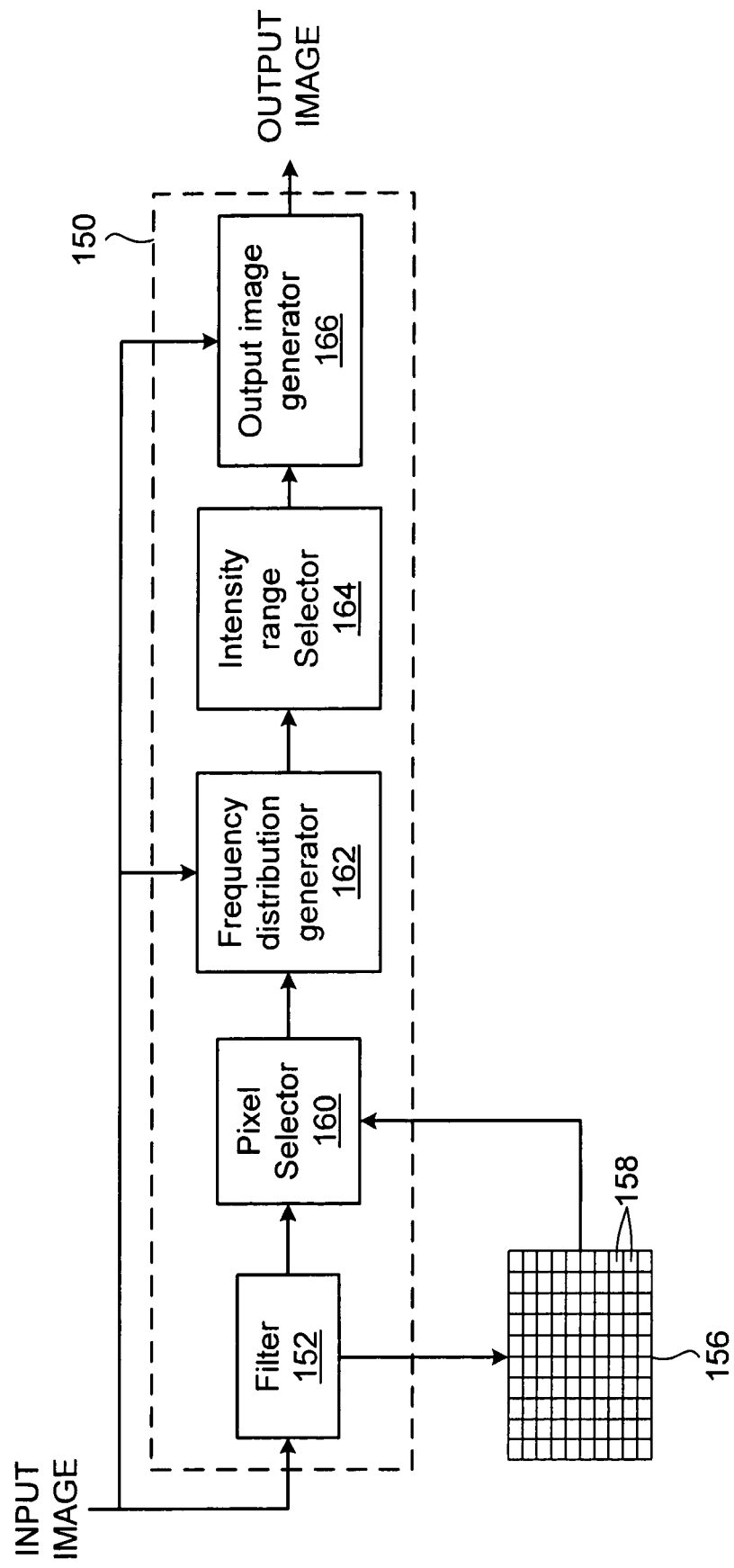
FIG. 3 is a schematic representation of functional blocks implemented by the processor circuit of FIG. 2 in accordance with one embodiment of the invention.

Referring to FIG. 3, functions provided by the program codes stored in the program memory 124 (shown in FIG. 2) are shown as functional blocks at 150. The blocks 150 generally co-operate to cause the processor circuit 120 to provide contrast enhancement functions in accordance with embodiments of the invention.

The functional blocks 150 include a filter 152 which is operably configured to filter the input image to produce a contrast value for each pixel. The contrast values that are produced by the filter 152 may be stored in a contrast value map 156. The contrast value map 156 includes a location 158 for storing a contrast value for each corresponding pixel 106 in the input image 102. In general, the contrast value produced by the filter 152 for each pixel is proportional to a gradient between an intensity of the pixel and an intensity of at least one adjacent pixel.

The functional blocks 150 also include a pixel selector 160. The pixel selector 160 is operably configured to select pixels in the input image 102 that have respective contrast values in the contrast value map 156 that meet a first criterion, thereby forming a selected plurality of pixels.

The functional blocks 150 further include a frequency distribution generator 162, which produces a frequency distribution of intensity values of the pixels in the input image 102 that are selected by the pixel selector 160.

The functional blocks 150 also include an intensity range selector 164. The intensity range selector 164 is operably configured to select at least one range of intensity values in the frequency distribution that meet a second criterion, thereby producing a selected range of intensity values for enhancement. The range of pixel intensities is selected from the frequency distribution produced by the frequency distribution generator 162.

The functional blocks 150 further include an output image generator 166, which is operably configured to produce the contrast enhanced output image 104 from the input image 102. The output image generator 166 may expands pixel intensity values in the input image 104 that fall within the selected range of intensity values and/or compresses pixel intensity values in the input image that fall outside the selected range of intensity values. Possibly pixel intensity values may be expanding, or compressed or both.

In other embodiments, some of the functions provided by the functional blocks 150 may be combined into a function block that provides more than one function. For example, in embodiments where the first criterion is a pre-determined criterion, the filter 152 may produce each contrast value and immediately determine whether the contrast value meets the first criterion.

Figure 4:
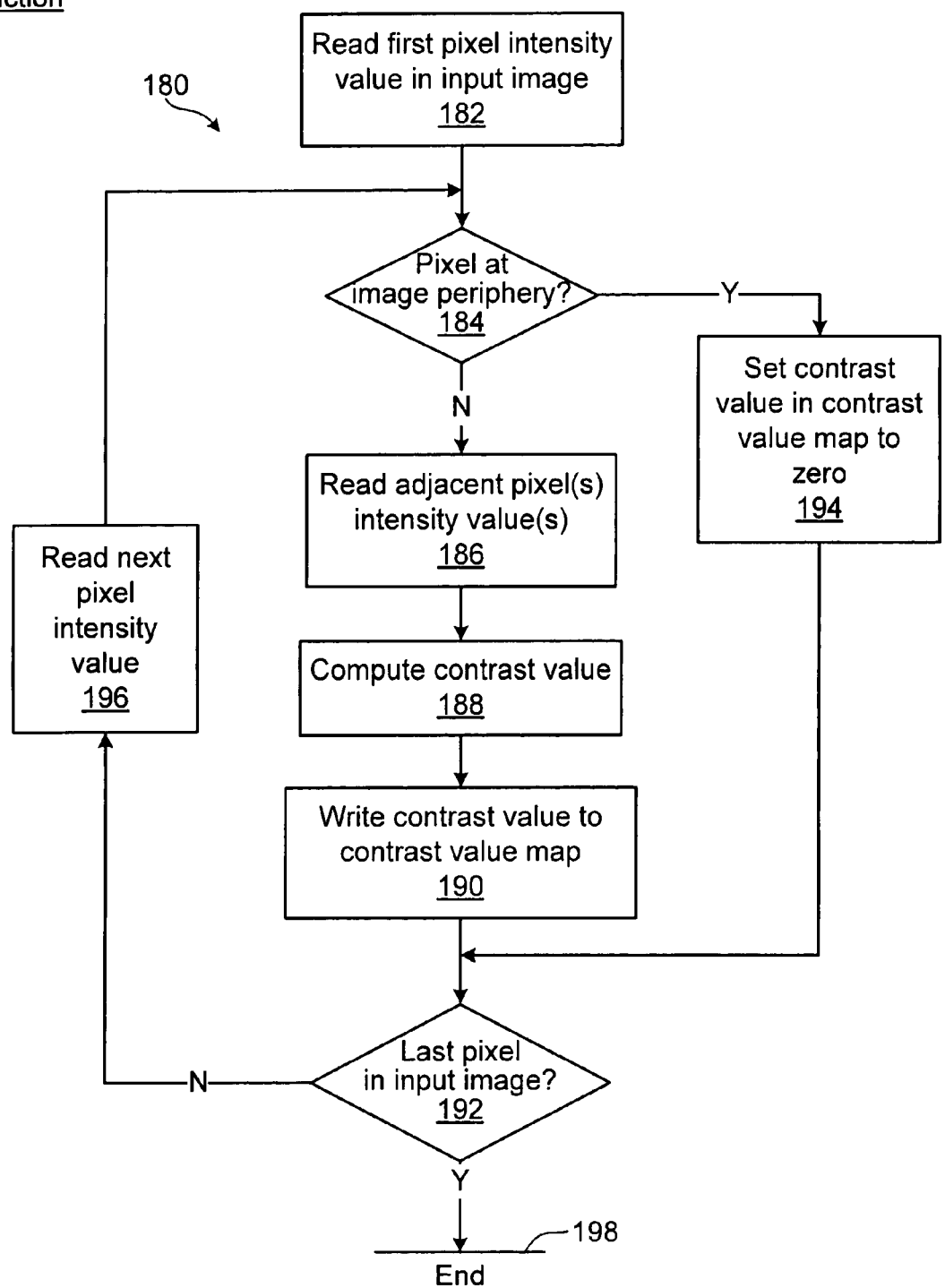
FIG. 4 is a flowchart of blocks of code for directing the processor circuit shown in FIG. 2 to perform a filter function.

Referring to FIG. 4, a flowchart of blocks of codes for directing the microprocessor 122 (shown in FIG. 2) to provide the filter function 152 is shown generally at 180. The actual code to implement each block may be written in any suitable program language, such as C, and/or C++, for example.

The process begins at block 182 which directs the microprocessor 122 to read a first pixel intensity value in the input image 102. Referring back to FIG. 1, in this embodiment pixels in the input image 102 are read row by row starting at the bottom left-hand corner (i.e. starting at pixel 114).

Referring again to FIG. 4, block 184 then directs the microprocessor 122 to determine whether the first pixel 114 is at the image periphery. As described later herein, the filter function may compute the contrast value as a function of intensity values of adjacent pixels, and accordingly may be unable to produce contrast values for pixels that are peripherally located in the input image 102 (such as the pixel 114 shown in FIG. 1). If at block 184, the first pixel is peripherally located then the process continues at block 194, which directs the microprocessor 122 to set the contrast stored in the contrast value map 156 to zero for the pixel.

The process then continues at block 192 which directs the microprocessor 122 to determine whether the pixel was the last pixel in the input image 102. If the pixel was not the last pixel, then the process continues at block 196, which directs the microprocessor 122 to read the next pixel intensity value (i.e. the pixel 116 shown in FIG. 1). The process then continues at block 184 as described above.

If at block 184 the pixel is not at the image periphery (for example pixel 118), then the process continues at block 186. Block 186 directs the microprocessor 122 to read adjacent pixel intensity values in accordance with a filter function used to compute the contrast values.

Figure 5:
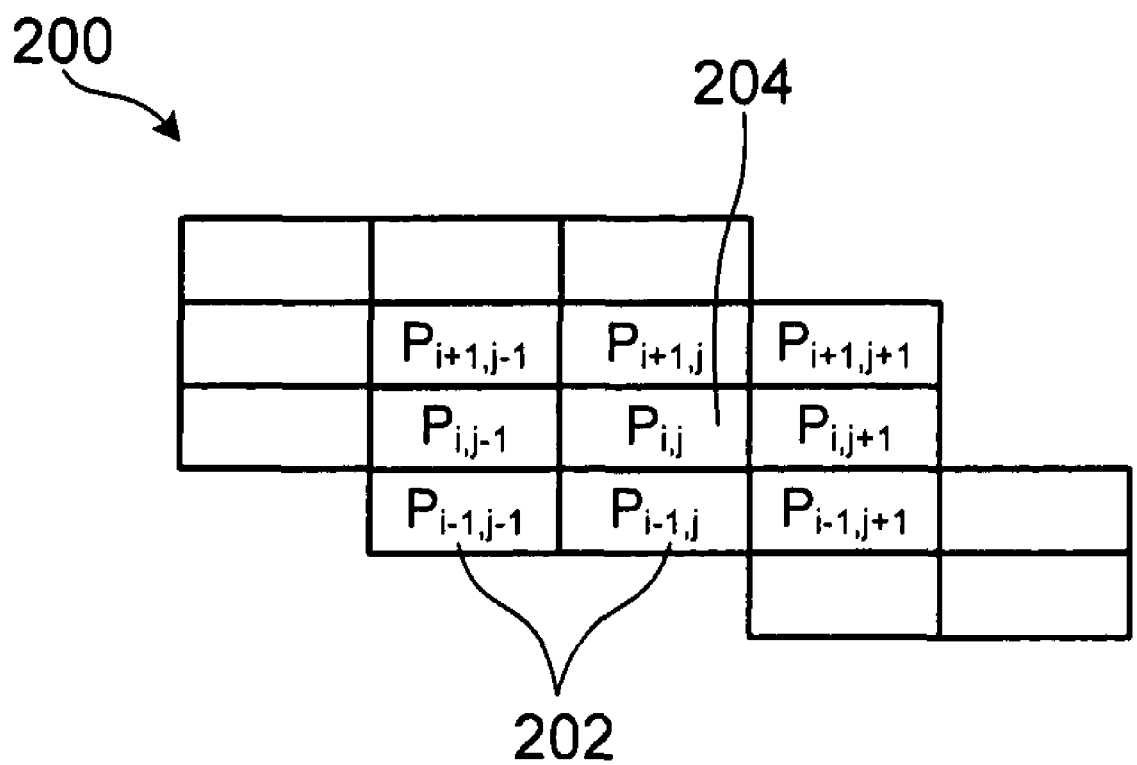
FIG. 5 is a schematic representation of an exemplary image portion which is to be contrast enhanced.

Referring now to FIG. 5, a schematic representation of a portion of an exemplary input image 102 is shown generally at 200. The image portion 200 includes a plurality of pixels 204 each having a pixel intensity value P. A central pixel 204, for which it is desired to compute the contrast value, has a pixel intensity value of $P_{i,j}$. In one embodiment, the contrast value is computed in accordance with the following filter function:

$$\text{Contrast Value} = ABS(4P_{i,j} - P_{i+1,j} - P_{i,j-1} - P_{i,j+1} - P_{i-1,j+1}) \quad \text{Eqn 1}$$

where the contrast value is expressed in arbitrary units and each of the values P are the respective pixel intensity values at the corresponding locations in the input image 200 shown in FIG. 5. Because the contrast level generally represents an intensity gradient, the value produced by the filter may have a negative or positive sign. Accordingly, in this embodiment, the absolute value is taken in equation 1 to cause all contrast values to have positive sign.

The filter function in equation 1 is one form of a Laplacian filter function, and in this form the intensity values $P_{i+1,j-1}$, $P_{i+1,j+1}$, $P_{i-1,j-1}$ and $P_{i-1,j+1}$ shown in FIG. 5 are not used. Alternatively, another form of Laplacian filter function may be implement that uses all of the intensity values P shown in FIG. 5.

In other embodiments filter functions such as a Robert's Edge filter or a Sobel filter may be implemented. In general the contrast value represents a rate of change of pixel intensity at each pixel from adjacent pixels. High contrast values are generally produced at pixels forming part of sharp edges in the input image 102, while low contrast values are produced in flat tints in the image.

Referring back to FIG. 4 the process then continues at block 188, which directs the microprocessor 122 to compute the contrast value using equation 1.

Block 190 then directs the microprocessor 122 to write the computed contrast value to the contrast value map 156 (shown in FIG. 3) at a location 158 corresponding to the location of the pixel $P_{i,j}$ in the input image 102.

The process then continues at block 192 as described above. If at block 192 the pixel is the last pixel in the input image 102, then the process ends at 198. If at block 192 the pixel is not the last pixel, then the process continues at 196 as described above.

Figure 6:
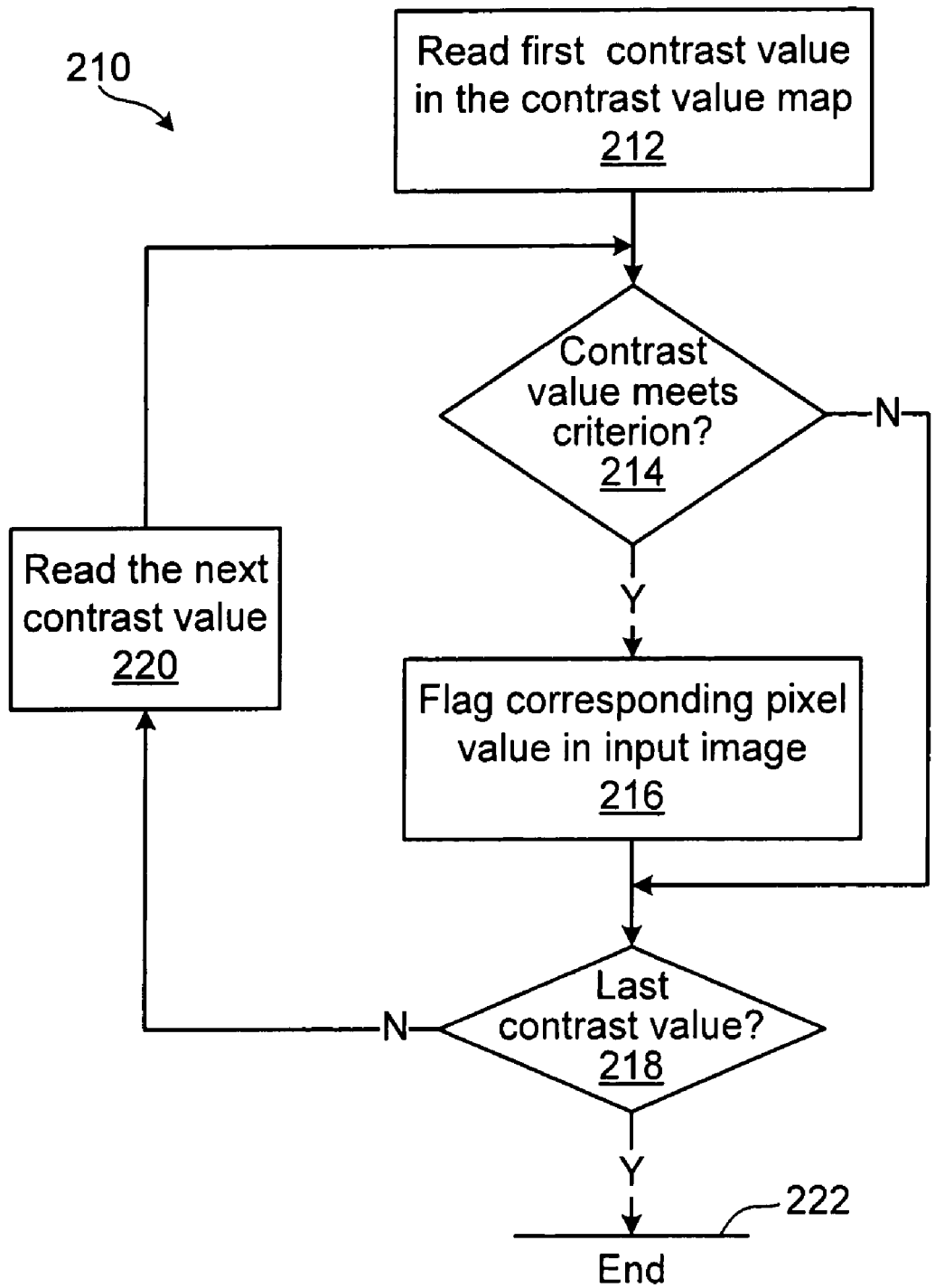
FIG. 6 is a flowchart of blocks of code for directing the processor circuit shown in FIG. 2 to perform a pixel selector function.

Referring to FIG. 6, a flowchart of blocks of codes for directing the processor circuit 120 (shown in FIG. 2) to provide the pixel selector function 160 is shown generally at 210.

The process begins at block 212, which directs the microprocessor 122 to read a first contrast value from the contrast value map 156 (shown in FIG. 3). Block 214 then directs the microprocessor 122 to determine whether the contrast value meets the first criterion.

An input image may include portions of flat tints and/or noise that have contrast values in a range of 1-8 units, and sharp edges having contrast values in the range of 30-40 units. In-between contrast values (i.e. 9-29 units) may be generally associated with small detail or texture, which may not be displayed to best effect in the output image 104. Accordingly, in one embodiment the first criterion at block 214 may be a pre-determined contrast value range between 9 and 29, for example. The pre-determined contrast value range may be stored as a "hard coded" value in the RAM 126 of the processor circuit 120, or may be set in response to configuration input received from a user.

If at block 214 the contrast value meets the first criterion, then the process then continues at block 216, which directs the microprocessor 122 to flag the corresponding pixel in the input image 102. In one embodiment, the flag may be stored as a flag map in the RAM 126. The flag map may include a plurality of locations corresponding to the pixels in the input image 102, each location holding a Boolean value, which when set to "1" indicates that the corresponding pixel in the image has been flagged.

The process then continues at block 218, which directs the microprocessor 122 to determine whether the contrast value read was the last contrast value in the contrast value map 156, in which case the process ends at 222. If the contrast value was not the last contrast value, then the process continues at block 220, which directs the microprocessor 122 to read the next contrast value. The process then continues at block 214 as described above.

If at block 214 the contrast value does not meet the first criterion, then the process continues at block 218 as described above (i.e. the corresponding pixel is not flagged).

Figure 7:
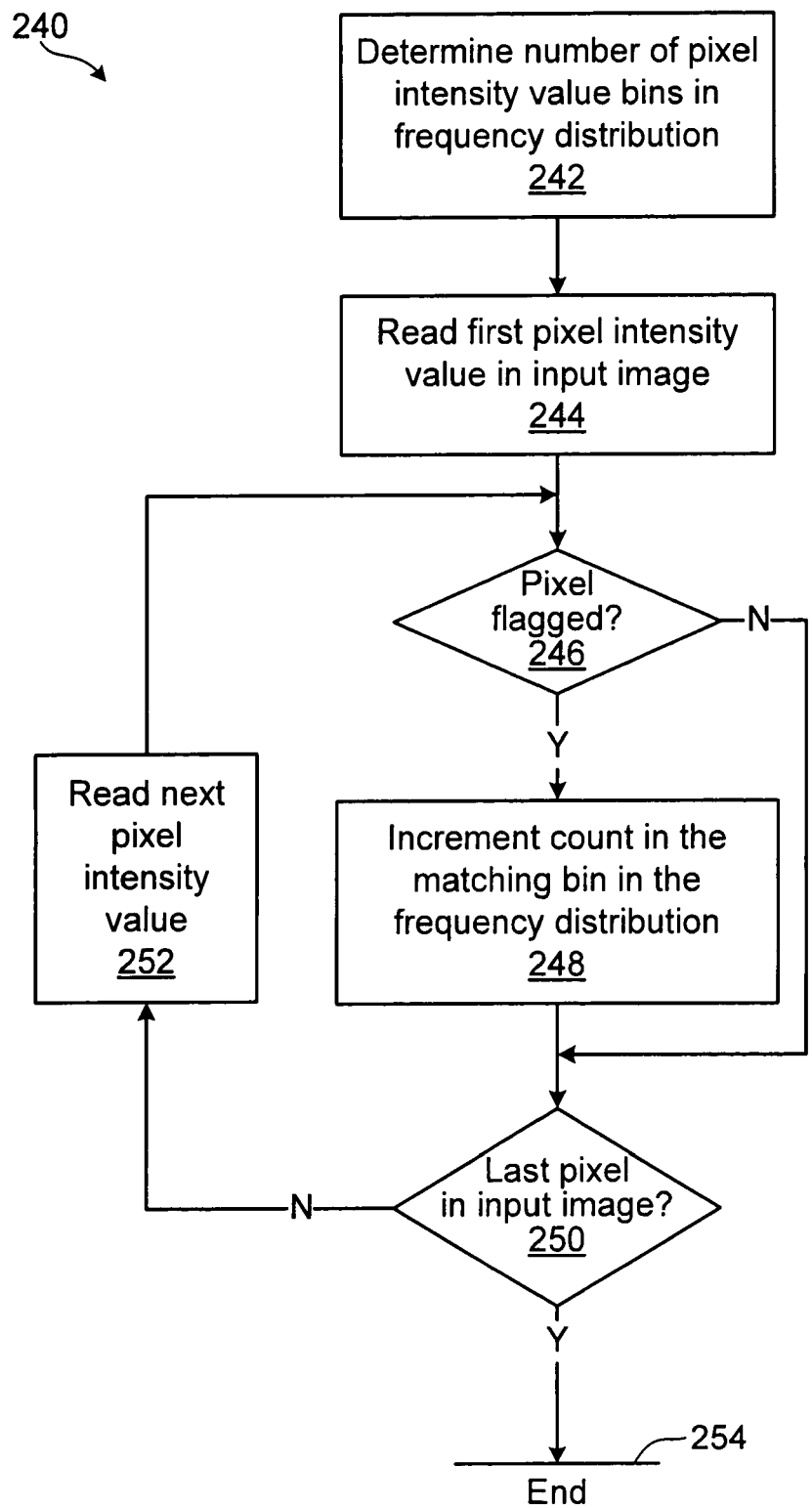
FIG. 7 is a flowchart of blocks of code for directing the processor circuit shown in FIG. 2 to perform a frequency distribution generator function.

Referring to FIG. 7, a flowchart of blocks of codes for directing the processor circuit 120 (shown in FIG. 2) to provide the frequency distribution generator function 162 is shown generally at 240.

In general producing the frequency distribution involves determining a frequency (i.e. how often) each pixel intensity value occurs in the input image. For example, in an 8-bit YCbCr color image, the Luma value (Y) provides for 256 different intensity levels (0-255), each of which may occur zero or more times in the input image. Accumulating such occurrences as a function of pixel intensity value yields a frequency distribution.

Figure 8:
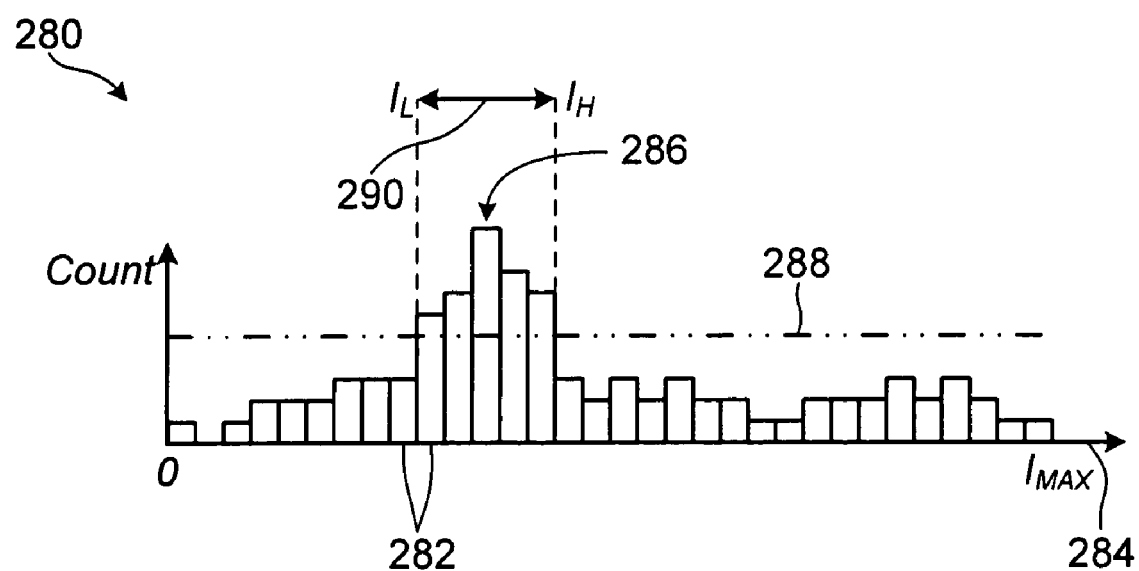
FIG. 8 is a graphical depiction of a histogram produced by the processor circuit shown in FIG. 2.

Referring to FIG. 8, a graphical depiction of a histogram frequency distribution is shown generally at 280. The histogram 280 includes a plurality of bins 282 plotted along an x-axis 284. The x-axis represents input pixel intensity. In this embodiment, ranges of pixel intensity values are associated with each bin. For example, for 256 intensity levels, each bin may include a bin range of 8 intensity values (i.e. 0-7, 8-15, 16-23, . . . up to 248-255). The height of each bin 282 in the y-axis direction represents a count of the number of occurrences of intensity values in the input image 102 that fall an intensity value range associated with the bin.

Bin values for the histogram 280 may be conveniently stored in a one dimensional array variable, which has a number of elements corresponding to the number of bins in the histogram, each element value in the array representing a count for the corresponding bin.

Referring back to FIG. 7, the process 240 begins at block 242, which directs the microprocessor 122 to determine a number of pixel intensity value bins in the frequency distribution. The number of bins may be a pre-determined value that is stored in the RAM 126, or may be configurable by a user. Using a small bin size may have an impact on computation performance of the processor circuit 120, while using large bin sizes may degrade the image quality and/or the effectiveness of the contrast enhancement. In this embodiment, the bin size is selected to be 8, which yields 32 bins in the histogram 280.

Block 244 then directs the microprocessor 122 to read the first pixel intensity value in the input image 102. Block 246 then directs the microprocessor 122 to read the flag map to determine whether the pixel has been flagged, which indicates to the microprocessor that the pixel should be included in the frequency distribution.

If the pixel has been flagged then the process continues at block 248. Block 248 directs the microprocessor 122 to determine which of the bins 282 in the histogram 280 the pixel intensity value falls, and to increment the count associated with the bin.

The process then continues at block 250, which directs the microprocessor 122 to determine whether the pixel is the last pixel in the input image 102. If at block 250 the pixel is the last pixel in the input image then the process ends at 254.

If at block 250 the pixel is not the last pixel, then the process continues at block 252, which directs the microprocessor 122 to read the next pixel intensity in the input image 102. The process then continues at block 246 as described above.

If at block 246, the pixel is not flagged, then the pixel intensity value is not included in the frequency distribution, and the process continues at block 250 as described above.

Referring back to FIG. 8, the exemplary histogram 280 has a single peak generally at 286. In other embodiments the histogram may include more than one peak, depending on the content of the input image 102. In general peaks in the histogram 280 represent a concentration of image intensity values in a bin and/or adjacent bins that also meet the first criterion associated with pixel contrast value, and thus represent good candidate pixels for contrast enhancement.

Figure 9:
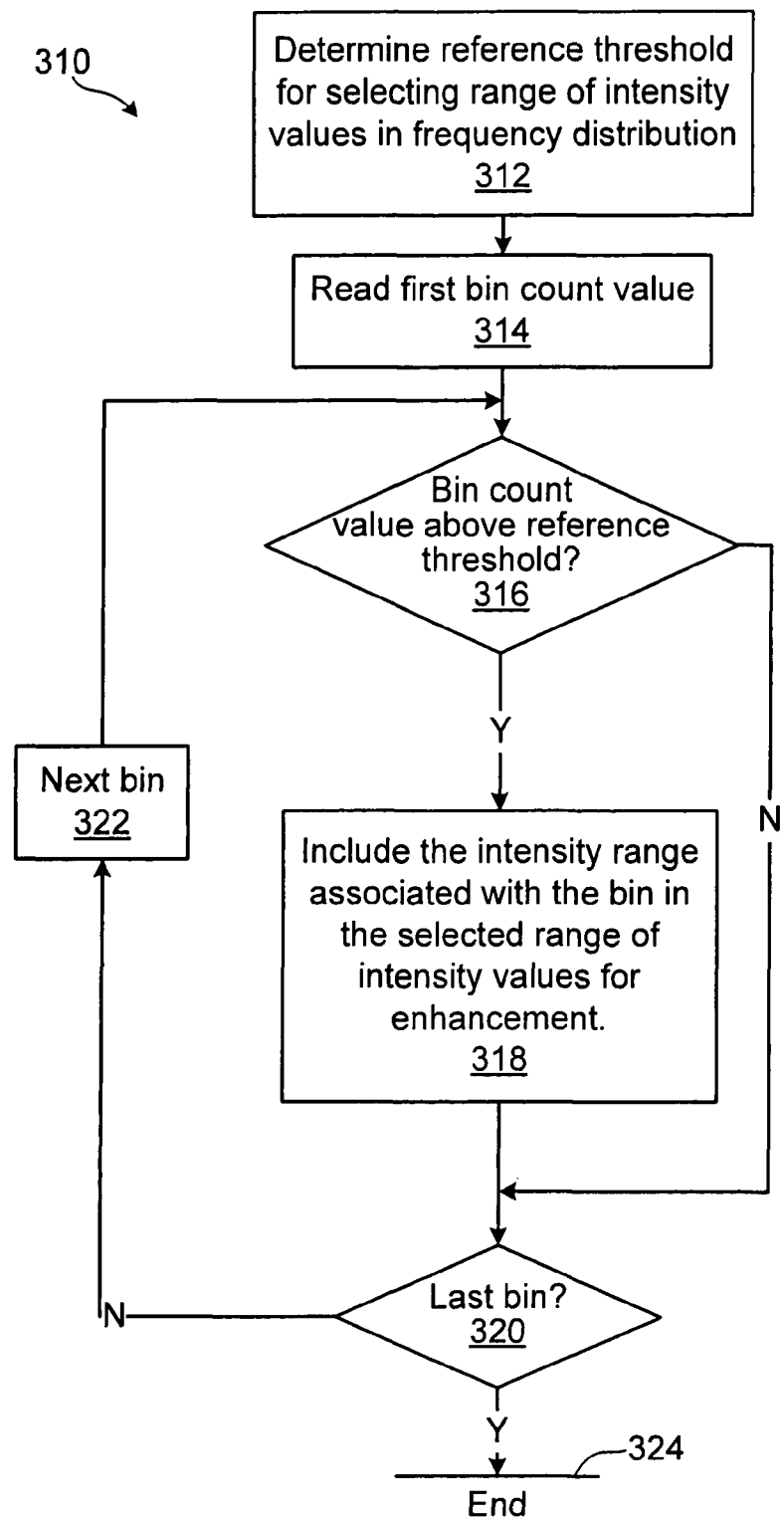
FIG. 9 is a flowchart of blocks of code for directing the processor circuit shown in FIG. 2 to perform an intensity range selector function.

Referring to FIG. 9, a flowchart of blocks of codes for directing the processor circuit 120 (shown in FIG. 2) to provide the intensity range selector function 164 is shown generally at 310.

The process begins at block 312, which directs the microprocessor 122 to determine a reference threshold for selecting a range of intensity values in the frequency distribution.

Referring back to FIG. 8, in the embodiment shown, the reference threshold value is computed by dividing the count of intensity value occurrences in the peak bin 286 by a factor of two. The reference threshold is shown as a broken line at 288 in FIG. 8, and intensity value bins that extend above the reference threshold 288 are selected for enhancement. In other embodiments the reference threshold may be selected to cause some proportion (for example 50%) of pixel intensity values to be selected for enhancement.

Referring back to FIG. 9, the process then continues at block 314, which directs the microprocessor 122 to read a count value associated with the first bin in the frequency distribution. Block 316 then directs the microprocessor 122 to determine whether the bin count value is above the reference threshold, in which case the process continues at block 318.

Block 318 directs the microprocessor 122 to include the intensity range associated with the bin in the selected range of intensity values for enhancement.

The process then continues at block 320, which directs the microprocessor 122 to determine whether the bin is the last bin in the frequency distribution. If the bin is the last bin in the frequency distribution then the process ends at block 324. If the bin is not the last bin, then the process continues at block 322, which directs the microprocessor 122 to read the next bin in the frequency distribution. The process then continues at block 316 as described above.

If at block 316 the bin count value is not above the reference threshold then the pixel intensity range associated with the bin is not selected for enhancement and process continues at block 320 as described above.

The process 310 thus causes a range of intensity values to be selected for enhancement. In the embodiment shown in FIG. 8, only a single range of intensity values 290 between intensities $I_L$ and $I_H$ is selected for enhancement. However in other embodiments, multiple ranges may be selected depending on the content of the input image 102.

Figure 10:
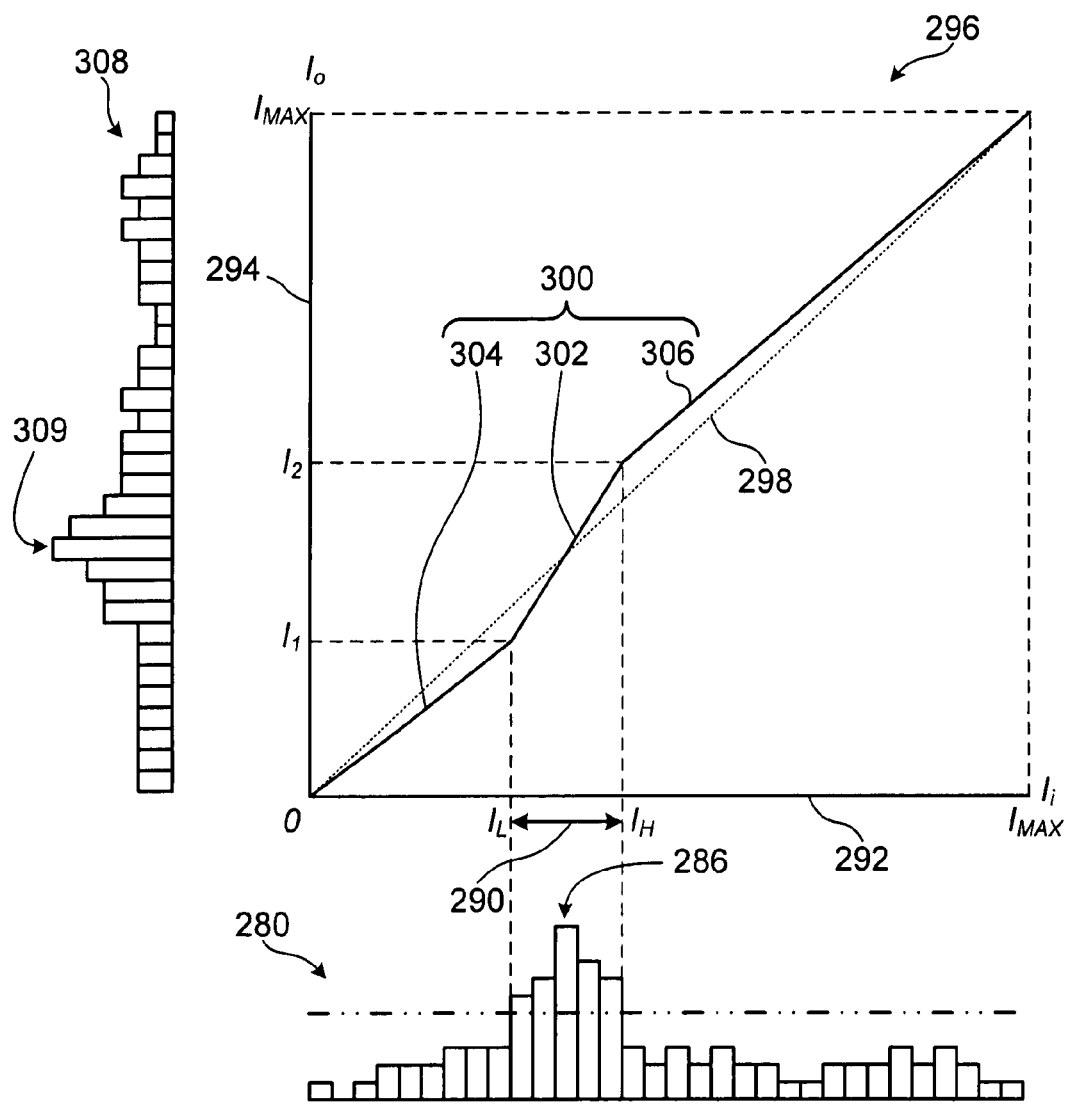
FIG. 10 is a graphical depiction of a tone mapping function produced by the processor circuit shown in FIG. 2.

Referring to FIG. 10, graphical depiction of a tone mapping function 300 for mapping input pixel intensity to output pixel intensity is shown at 296. The x-axis 292 of the graph 296 represents input intensity values $I_i$, and the y-axis 294 represents output intensity values $I_o$. The x-axis 292 and y-axis 294 each have a maximum value of $I_{max}$ (which for an 8-bit luma range would be 255).

A line 298 on the graph 296 represents a tone mapping function having a slope of unity. The tone mapping function 298, if used to map input pixel intensities to output pixel intensities would result in no contrast enhancement, since output pixels would have identical intensities to the input pixels.

The unity slope tone mapping function 298 thus represents a starting point for producing the tone mapping function 300 for enhancing contrast of output pixels in the output image 104. The tone mapping function 300 includes a first portion 302, a second portion 304, and a third portion 306.

The first portion 302 of the tone mapping function 300 has a slope greater than unity, and maps input pixel intensity values in the range $I_L$ to $I_H$ to a new expanded range of output pixel intensity values $I_1$ to $I_2$. The expanded range $I_1$ to $I_2$ spans a larger range of intensity values than the corresponding input pixel intensities and thus has enhanced contrast.

In one embodiment the slope of the first portion 302 of the tone mapping function 300 is increased by a pre-determined proportion $\Delta_s$. In the embodiment shown in FIG. 10 $\Delta_s$=0.6, which corresponds to a 60% increase in slope (i.e an increase from a unity slope to a slope of 1.6). A function relating output intensity $I_o$ to input intensity $I_i$ for the first portion 302 of the tone mapping function 300, is given by the following relation:

$$I_o = I_i(1 + \Delta_S) - \frac{\Delta_S(I_H + I_L)}{2} \qquad \text{Eqn 2}$$

for intensity values $I_i$ between $I_L$ and $I_H$.

The second portion 304 of the tone mapping function 300 has a slope of less than unity, and maps input pixel intensity values in the range 0 to $I_L$ to a new compressed range of output pixel intensity values 0 to $I_1$. The compressed range 0 to $I_1$ spans a smaller range of intensity values than the corresponding input pixel intensities and thus has reduced contrast. Advantageously, the range 0 to $I_1$ may include noise and/or other flat tints that do not cause easily perceptible changes in image quality when displayed with reduced contrast. A function relating output intensity $I_o$ to input intensity $I_i$ for the second portion 304 of the tone mapping function 300, is given by the following relation:

$$I_o = I_i\left(1 - \frac{\Delta_S(I_H - I_L)}{2I_L}\right) \qquad \text{Eqn 3}$$

for intensity values $I_i$ between 0 and $I_L$.

The third portion 306 of the tone mapping function 300 has a slope of less than unity, and maps input pixel intensity values in the range $I_H$ to $I_{MAX}$ to a new compressed range of output pixel intensity values $I_2$ to $I_{MAX}$. Advantageously, the range $I_2$ to $I_{MAX}$ may include sharp edges that are sufficiently well defined to not cause easily perceptible changes in image quality when displayed with reduced contrast. A function relating output intensity $I_o$ to input intensity $I_i$ for the third portion 306 of the tone mapping function 300, is given by the following relation:

$$I_o = I_i\left(1 - \frac{\Delta_S(I_H - I_L)}{2(I_{MAX} - I_H)}\right) + \frac{I_{MAX}\Delta_S(I_H - I_L)}{2(I_{MAX} - I_H)} \qquad \text{Eqn 4}$$

for intensity values $I_i$ between $I_H$ and $I_{MAX}$.

The input image histogram 280 (shown in FIG. 8) is shown for reference in FIG. 10, along with a corresponding output image histogram 308. The increased slope of the first portion 302 of the tone mapping function 300, causes a general flattening of a peak 309 in the output histogram 308 (in comparison to the peak 286 in the input image histogram 280). Consequently, the output image 104 has a lower concentration of intensity values around the peak 309 and intensity values in this range have enhanced contrast.

In the example shown in FIG. 10, the tone mapping function 300 includes a single portion 302 that has a slope greater than unity. However for images that result in an input histogram 280 that has more than one peak 286, the tone mapping function 300 would include an additional portion (not shown) having a slope greater than unity and additional portions having slope less than unity between the greater than unity slope portions.

In one embodiment, the equations 2, 3 and 4 may be used directly to compute output pixel intensity values from each input pixel intensity value in the input image. In this embodiment, the input pixel intensity is matched to one of the ranges corresponding to the portions 302, 304, or 306 of the tone mapping function 300 (i.e. one of the ranges 0 and $I_L$, $I_L$ and $I_H$, $I_H$ and $I_{MAX}$) and the equation corresponding to the matched range is used to compute the output pixel intensity value.

Alternatively, in another embodiment the equations 2, 3 and 4 are used to produce a look-up table to provide a more computationally efficient tone transfer from input pixel intensity to output pixel intensity.

Referring to FIG. 11, an exemplary look up table is shown generally at 360. The look up table 360 includes a plurality of pairs of intensity values 362. Each pair 362 includes an input intensity value 364, and an associated output pixel intensity value 366. For 8-bit luma values, the intensity values 364 and 366 include values ranging from 0 to 255.

Look-up tables generally provide improved computational performance over direct computation of each pixel using the equations 2, 3 or 4, since in producing the look up table the equations 2, 3 or 4 are only computed 256 times (for an 8-bit luma). Once the look-up table is established producing output pixel values involves comparison operations rather than arithmetic operations. In contrast, using equations 2, 3, or 4 to directly compute each output pixel intensity would involve over 300,000 arithmetic operations for a 640 pixel by 480 pixel input image size. Computational efficiency may be particularly important in embodiments where the input image includes a plurality of image frames, such as included in a video stream, for example.

Figure 12:
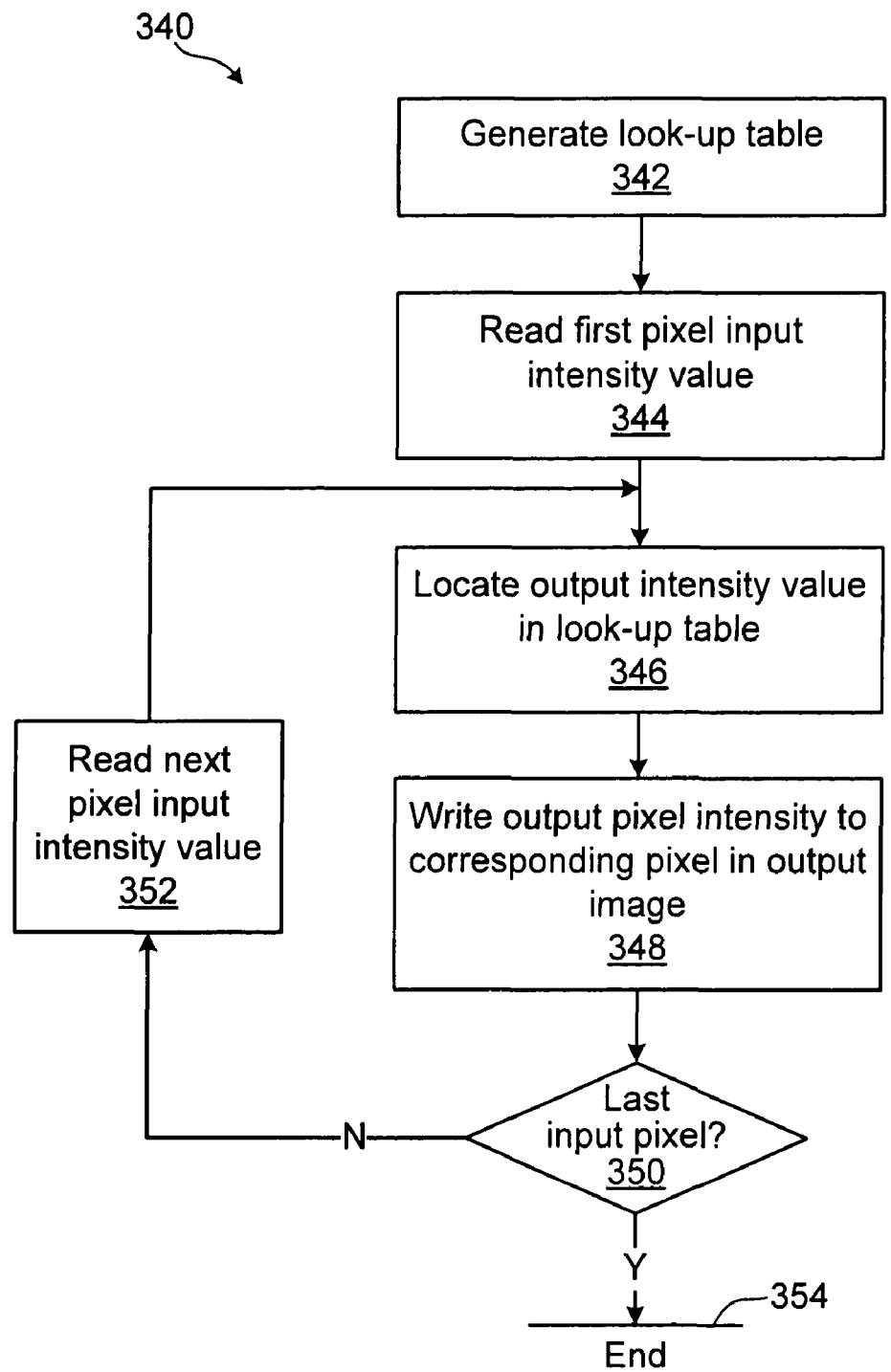
FIG. 12 is a flowchart of blocks of code for directing the processor circuit shown in FIG. 2 to perform an output image generator function.

Referring to FIG. 12, a flow chart of blocks of codes for directing the processor circuit 120 (shown in FIG. 2) to provide the output image generator function 166 is shown generally at 340. The process begins at block 342, which directs the microprocessor 122 to generate the look-up table 360 (shown in FIG. 11).

Figure 13:
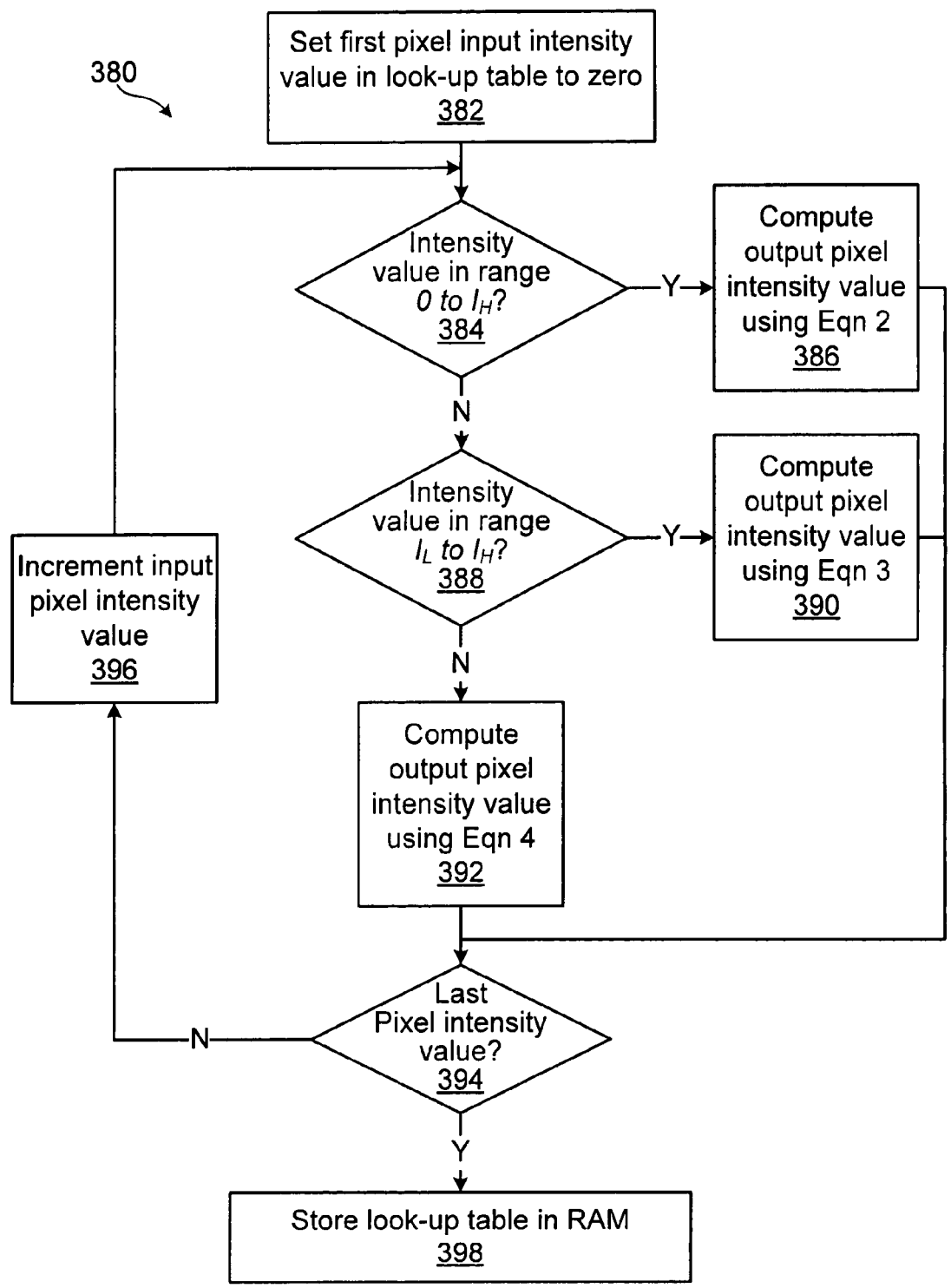
FIG. 13 is a flowchart of blocks of code for directing the processor circuit shown in FIG. 2 to perform a process for generating the look up table shown in FIG. 11.

Referring to FIG. 13, a process for generating the look-up table 360 is shown generally at 380. The process 380 begins at block 382, which directs the microprocessor 122 to set the first input pixel intensity value 364 in the look-up table 360 to zero.

The process then continues at block 384, which directs the microprocessor 122 to determine whether the intensity of the pixel is within the range 0 to $I_L$, in which case the process continues at block 386.

Block 386 directs the microprocessor 122 to compute the corresponding output pixel intensity value 366 for the look-up table 360 using equation 2.

Block 394 then directs the microprocessor 122 to determine whether the pixel intensity value was the last pixel intensity value. If not, then the process continues at 396, which directs the microprocessor 122 to increment the input pixel intensity value to the next sequential pixel intensity value. The process then continues at block 384 as described above.

If at block 384 the pixel intensity value is not in the range 0 to $I_L$, then the process continues at block 388, which directs the microprocessor 122 to determine whether the intensity value is within the range $I_L$ to $I_H$, in which case the process continues at block 390.

Block 390 directs the microprocessor 122 to compute the corresponding output pixel intensity value 366 for the look-up table 360 using equation 3. The process then continues at block 394 as described above.

If at block 388 the pixel intensity value is not in the range $I_L$ to $I_H$, then the process continues at block 392, which directs the microprocessor 122 to compute the corresponding output pixel intensity value 366 for the look-up table 360 using equation 4. The process then continues at block 394 as described above.

If at block 394 the pixel intensity value is not the last pixel intensity value then the process continues at block 398. Block 398 directs the microprocessor 122 to store the look up table in the RAM 126.

Referring back to FIG. 12, the process 340 then continues at block 344, which directs the microprocessor 122 read the first pixel input intensity value in the input image 102. Block 346 then directs the microprocessor 122 to locate a pixel output intensity value 366 in the look-up table that corresponds to the first pixel input intensity value read in block 344.

Block 348 then directs the microprocessor 122 to write the output pixel intensity value to the corresponding pixel location in the output image 104.

The process then continues at block 350, which directs the microprocessor 122 to determine whether the pixel was the last pixel in the input image 102. If the pixel was not the last pixel, then the process continues at block 352, which directs the microprocessor 122 to read the next pixel intensity value in the input image 102.

If at block 350, the pixel is the last pixel in the input image then the process ends at 354.

Advantageously, the embodiments of the invention described herein may be implemented to provide automatic contrast enhancement of images in a computationally efficient manner. The enhancement may be applied to images, such as video images, where the available time for processing each image frame is limited.

While specific embodiments of the invention have been described and illustrated, such embodiments should be considered illustrative of the invention only and not as limiting the invention as construed in accordance with the accompanying claims.

What is claimed is:

1. A method for enhancing an input image to produce a contrast enhanced output image, the method comprising:
   producing a contrast value for each pixel in the input image, said contrast value being proportional to an intensity gradient between each respective pixel and at least one pixel adjacent said respective pixel;
   selecting pixels in said input image having respective contrast values that meet a first criterion, thereby forming a selected plurality of pixels;
   producing a frequency distribution of intensity values of said selected plurality of pixels;
   selecting at least one range of intensity values in said frequency distribution that meet a second criterion, thereby producing a selected range of intensity values for enhancement;
   producing a tone mapping function for mapping pixel intensity values in the input image to pixel intensity values in the output image;
   producing the contrast enhanced output image by computing an output intensity value according to said tone mapping function for every pixel in the input image, wherein said producing comprises at least one of:
      selectively expanding the pixel intensity values of all of those pixels in the input image with pixel intensity values that fall within said selected range of intensity values; and
      selectively compressing the pixel intensity values of all of those pixels in the input image with pixel intensity values that fall outside said selected range of intensity values.

2. The method of claim 1 wherein said tone mapping function comprises:
   a first portion for mapping pixel intensity values in said selected range of intensity values, said first portion having a slope greater than unity; and
   second and third portions for mapping pixel intensity values respectively above and below said selected range of intensity values, said second and third portions having a slope less than unity.

3. The method of claim 2 wherein producing the contrast enhanced output image comprises producing a look-up table having a plurality of pairs of intensity values, each pair of intensity values including an input pixel intensity value and an associated output pixel intensity value, said associated output pixel intensity value being computed in accordance with said tone mapping function.

4. The method of claim 1 wherein producing said contrast value comprises edge filtering the input image.

5. The method of claim 4 wherein said edge filtering comprises edge filtering the input image using one of a Roberts edge filter, a Sobel edge filter, and a Laplacian edge filter.

6. The method of claim 1 further comprising producing a contrast value map having a plurality of locations, each location being operable to hold a contrast value associated with a respective pixel in the input image.

7. The method of claim 6 further comprising causing contrast values in said contrast value map that are associated with peripherally located pixels in said input image to be set to zero.

8. The method of claim 1 wherein producing said contrast value comprises producing a contrast value proportional to an intensity gradient between each respective pixel and a plurality of pixels adjacent said respective pixel.

9. The method of claim 1 wherein forming said selected plurality of pixels that meet said first criterion comprises selecting pixels in the input image that have contrast values that fall within a pre-determined range of contrast values.

10. The method of claim 1 wherein forming said selected plurality of pixels that meet said first criterion comprises:
determining a range of contrast values to be used as said first criterion; and
selecting pixels in the input image that have contrast values that fall within a said range of contrast values.

11. The method of claim 1 wherein producing said frequency distribution comprises producing a histogram of intensity values of said selected plurality of pixels, said histogram including a plurality of bins, each bin having an associated range of pixel intensity values and an associated count, said count representing a quantity of pixels in said selected plurality of pixels that fall within said range associated with each bin.

12. The method of claim 1 wherein producing said selected range of intensity values that meet said second criterion comprises selecting intensity values in said frequency distribution that are above a reference threshold.

13. The method of claim 12 further comprising determining said reference threshold.

14. The method of claim 13 wherein determining said reference threshold comprises selecting a reference threshold to cause a pre-determined proportion of said intensity values in said frequency distribution to fall within said selected range of pixel intensity values for enhancement.

15. The method of claim 13 wherein determining said reference threshold comprises:
locating a peak of said frequency distribution; and
setting the reference threshold to a pre-determined proportion of said peak.

16. An apparatus for enhancing an input image to produce a contrast enhanced output image, the apparatus comprising:
a filter operably configured to produce a contrast value for each pixel in the input image, said contrast value being proportional to an intensity gradient between each respective pixel and at least one pixel adjacent said respective pixel;
a pixel selector operably configured to select pixels in said input image having respective contrast values that meet a first criterion thereby forming a selected plurality of pixels;
a frequency distribution generator operably configured to produce a frequency distribution of intensity values of said selected plurality of pixels;
an intensity range selector operably configured to select at least one range of intensity values in said frequency distribution that meet a second criterion, thereby producing a selected range of intensity values for enhancement;
an output image generator operably configured to produce to produce a tone mapping function for mapping pixel intensity values in the input image to pixel intensity values in the output image and to produce the contrast enhanced output image by computing an output intensity value according to said tone mapping function for every pixel in the input image, wherein said producing comprises at least one of:
selectively expanding the pixel intensity values of all of those pixels in the input image with pixel intensity values that fall within said selected range of intensity values; and
selectively compressing the pixel intensity values of all of those pixels in the input image with pixel intensity values that fall outside said selected range of intensity values.

17. The apparatus of claim 16 wherein said tone mapping function comprises:
a first portion for mapping pixel intensity values in said selected range of intensity values, said first portion having a slope greater than unity; and
second and third portions for mapping pixel intensity values respectively above and below said selected range of intensity values, said second and third portions having a slope less than unity.

18. The apparatus of claim 17 wherein said output image generator is operably configured to produce a look-up table having a plurality of pairs of intensity values, each pair of intensity values including an input pixel intensity value and an associated output pixel intensity value, said associated output pixel intensity value being computed in accordance with said tone mapping function.

19. The apparatus of claim 16 wherein said filter comprises an edge filter.

20. The apparatus of claim 19 wherein said edge filter comprises one of a Roberts edge filter, a Sobel edge filter, and a Laplacian edge filter.

21. The apparatus of claim 16 wherein said filter is operably configured to produce a contrast value map having a plurality of locations, each location being operable to hold a contrast value associated with a respective pixel in the input image.

22. The apparatus of claim 21 wherein said filter is operably configured to cause contrast values in said contrast value map that are associated with peripherally located pixels in said input image to be set to zero.

23. The apparatus of claim 16 wherein said filter is operably configured to produce a contrast value proportional to an intensity gradient between each respective pixel and a plurality of pixels adjacent said respective pixel.

24. The apparatus of claim 16 wherein said pixel selector is operably configured to select pixels in the input image that have contrast values that fall within a pre-determined range of contrast values.

25. The apparatus of claim 16 wherein said pixel selector is operably configured to form said selected plurality of pixels that meet said first criterion by:
determining a range of contrast values to be used as said first criterion; and
selecting pixels in the input image that have contrast values that fall within a said range of contrast values.

26. The apparatus of claim 16 wherein said frequency distribution generator is operably configured to produce said frequency distribution by producing a histogram of intensity values of said selected plurality of pixels, said histogram including a plurality of bins, each bin having an associated range of pixel intensity values and an associated count, said count representing a quantity of pixels in said selected plurality of pixels that fall within said range associated with each bin.

27. The apparatus of claim 16 wherein said intensity range selector is operably configured to produce said selected range of intensity values by selecting intensity values in said frequency distribution that are above a reference threshold.

28. The apparatus of claim 27 wherein said intensity range selector is operably configured to determine said reference threshold.

29. The apparatus of claim 28 wherein said intensity range selector is operably configured to determine said reference threshold by selecting a reference threshold to cause a predetermined proportion of said intensity values in said frequency distribution to fall within said selected range of pixel intensity values for enhancement.

30. A non-transitory computer readable medium encoded with processor executable code for directing a processor circuit to execute a method for enhancing an input image to produce a contrast enhanced output image, the codes directing the processor circuit to:
　produce a contrast value for each pixel in the input image, said contrast value being proportional to an intensity gradient between each respective pixel and at least one pixel adjacent said respective pixel;
　select pixels in said input image having respective contrast values that meet a first criterion, thereby forming a selected plurality of pixels;
　produce a frequency distribution of intensity values of said selected plurality of pixels;
　select at least one range of intensity values in said frequency distribution that meet a second criterion, thereby producing a selected range of intensity values for enhancement;
　produce a tone mapping function for mapping pixel intensity values in the input image to pixel intensity values in the output image;
　produce the contrast enhanced output image by computing an output intensity value according to said tone mapping function for every pixel in the input image, wherein said producing comprises at least one of:
　　selectively expanding the pixel intensity values of all of those pixels in the input image with pixel intensity values that fall within said selected range of intensity values; and
　　selectively compressing the pixel intensity values of all of those pixels in the input image with pixel intensity values that fall outside said selected range of intensity values.

31. An apparatus for enhancing an input image to produce a contrast enhanced output image, the apparatus comprising:
　means for producing a contrast value for each pixel in the input image, said contrast value being proportional to an intensity gradient between each respective pixel and at least one pixel adjacent said respective pixel;
　means for selecting pixels in said input image having respective contrast values that meet a first criterion, thereby forming a selected plurality of pixels;
　means for producing a frequency distribution of intensity values of said selected plurality of pixels;
　means for selecting at least one range of intensity values in said frequency distribution that meet a second criterion, thereby producing a selected range of intensity values for enhancement;
　means for producing a tone mapping function for mapping pixel intensity values in the input image to pixel intensity values in the output image;
　means for producing the contrast enhanced output image computing an output intensity value according to said tone mapping function for every pixel in the input image, wherein said means for producing comprises, at least one of:
　　means for selectively expanding the pixel intensity values of all of those pixels in the input image with pixel intensity values that fall within said selected range of intensity values; and
　　means for selectively compressing the pixel intensity values of all of those pixels in the input image with pixel intensity values that fall outside said selected range of intensity values.

\* \* \* \* \*

UNITED STATES PATENT AND TRADEMARK OFFICE
CERTIFICATE OF CORRECTION

| | | |
|---|---|---|
| PATENT NO. | : 8,411,983 B2 | Page 1 of 1 |
| APPLICATION NO. | : 11/848922 | |
| DATED | : April 2, 2013 | |
| INVENTOR(S) | : Jeff Wei | |

It is certified that error appears in the above-identified patent and that said Letters Patent is hereby corrected as shown below:

In the Claims

In Claim 16, column 16, line 4 "configured to produce to produce" should read --configured to produce--

Signed and Sealed this
Twenty-third Day of December, 2014

Michelle K. Lee
*Deputy Director of the United States Patent and Trademark Office*